Jan. 31, 1961  C. W. SINCLAIR ET AL  2,969,825
WHEEL RIM
Filed March 11, 1957
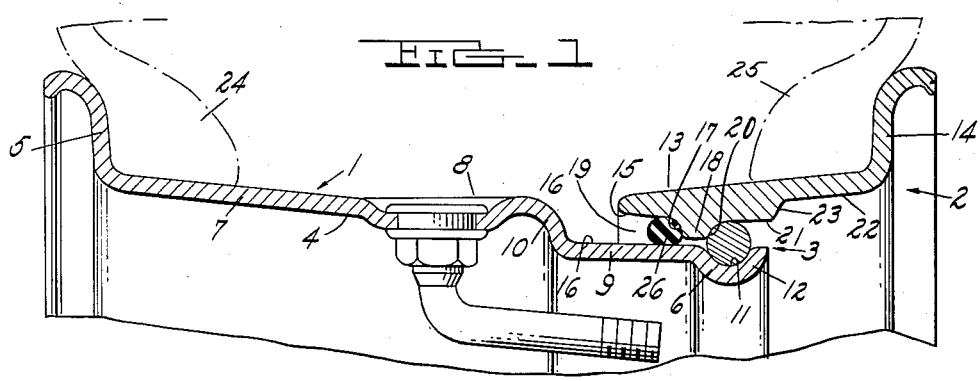
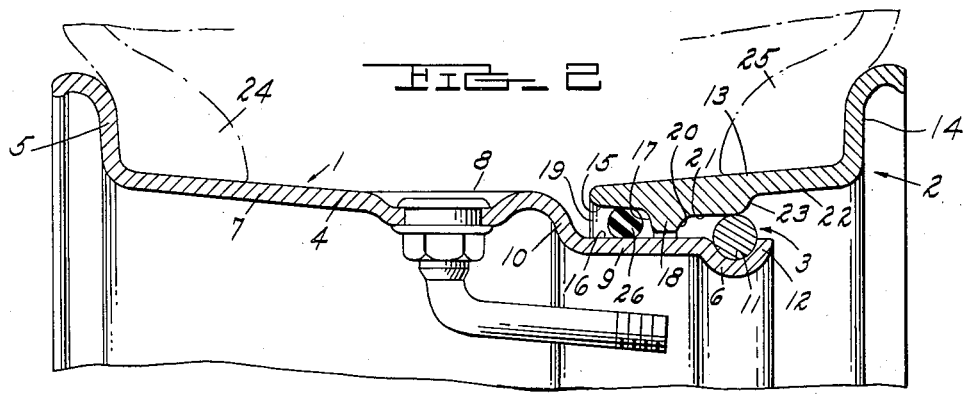
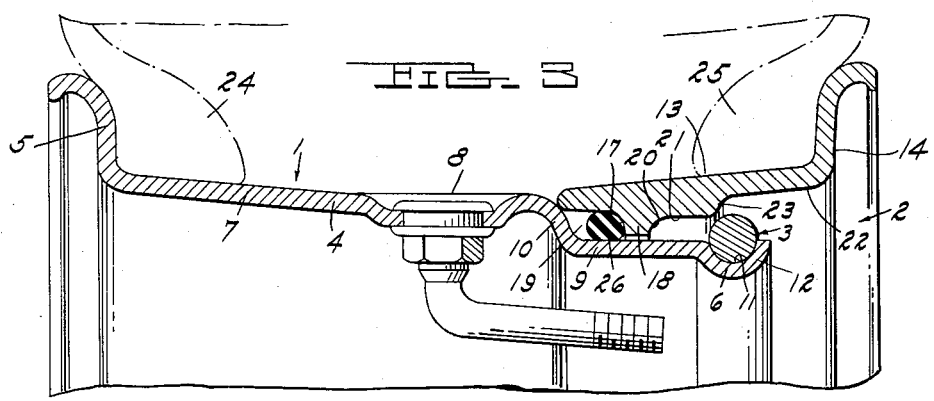
INVENTOR.
CHARLES W. SINCLAIR
RUPERT L. ATKIN
BY
Whittemore, Hulbert & Belknap
ATTORNEYS

United States Patent Office 2,969,825
Patented Jan. 31, 1961

---

2,969,825

WHEEL RIM

Charles W. Sinclair, Detroit, and Rupert L. Atkin, Grosse Pointe Woods, Mich., assignors to Kelsey-Hayes Company, Detroit, Mich., a corporation of Delaware Filed Mar. 11, 1957, Ser. No. 645,118

4 Claims. (Cl. 152—410)

This invention relates to rims and refers more particularly to rims for pneumatic tubeless tires.

The invention has for an object to provide an improved rim constructed to facilitate mounting and demounting the tubeless tire and to maintain air pressure.

The invention has for another object to provide an improved rim constructed to permit easy access to the interior of the tire casing without demounting it.

The invention has for still another object to provide an improved rim comprising an annular base member, an annular tire retaining member and a sealing member between the base member and tire retaining member for preventing the escape of air therebetween, the sealing member being subject to the air in the tire to increase the seal.

These and other objects of the invention will become apparent from the following description taken in connection with the accompanying drawing in which:

Figure 1 is an axial section through a portion of a rim embodying the invention.

Figure 2 is a view similar to Figure 1, showing the parts in another position.

Figure 3 is a view similar to Figure 1, showing the parts in still another position.

The rim is designed for use with pneumatic tubeless tires and is adapted to form part of a motor vehicle wheel. In general the rim comprises the annular base member 1, the detachable annular tire retaining member 2 and the detachable transversely split clamping ring member 3 for retaining the tire retaining member on the base member.

The base member is endless and has the base 4, the annular tire retaining flange 5 extending generally radially outwardly from one edge of the base and the annular gutter 6 at the other edge of the base. The base 4 is formed with the annular tire bead seat portion 7 flared toward and connecting into the tire retaining flange 5, the axially extending annular portion 8 leading from the bead seat portion, and the axially extending annular portion 9 leading from the gutter 6. The annular portion 9 has an external diameter less than the annular portion 8 and is connected to the latter by the axially outwardly and radially inwardly inclined annular portion 10. The bottom wall 11 of the gutter presents a radially outwardly facing surface having an external diameter less than that of the annular portion 9, and the annular terminal wall 12 of the gutter has an external diameter which is preferably slightly less than the external diameter of the annular portion 9.

The detachable annular tire retaining member 2 is endless and is movable over the terminal wall 12. The tire retaining member has the tire bead seat portion 13 and the integral tire retaining flange 14 extending generally radially outwardly from the axially outer edge of the tire bead seat portion. The tire bead seat portion has at its axially inner end a radially inner surface 15 spaced radially outwardly from the axially extending radially outer surface 16 of annular portion 9 of the base 4 and flared axially inwardly. The radially inner surface 15 leads into the generally radially extending axially inwardly facing surface 17 of the annular rib 18 which extends radially inwardly from the tire bead seat portion 13. The minimum diameter of rib 18 is slightly greater than the maximum external diameter of the annular portion 9 of the base to clear the latter. The surfaces 15, 16 and 17 cooperate to define a generally axially extending annular space or recess 19 substantially closed at the axially outer end and open at the axially inner end in the preliminary inflatable position of Fig. 2 and the inflated position of Fig. 1. The cross-section of the recess 19 decreases in an axially outward direction because of the fact that the flaring surface 15 and the axial surface 16 converge in an axially outward direction. The rib has a generally radially extending axially outwardly facing surface 20 leading into the generally axially extending surface 21. The axially outwardly flared surface 22 of larger diameter than the surface 21 is separated from surface 21 by a generally radially extending surface 23.

The detachable clamping member 3 is a ring of circular cross-section transversely split at one point which, in the final or completely assembled position of the rim members, occupies a position between and engaging the bottom wall 11 of the gutter, the terminal wall 12 and the surfaces 20 and 21 of the tire retaining member 2. The clamping member carries the radial load between the base and tire retaining members, the minimum and maximum sectional dimensions of the clamping member for engaging the bottom wall 11 of the gutter and the radially inner surface 21 being normally greater before assembly of the rim members than the minimum radial distances between the bottom wall of the gutter and the surface 21. During assembly of the base, tire retaining and clamping members, the clamping member has wedging engagement with the tire retaining member and is contracted against the bottom wall of the gutter so that the clamping member firmly engages both the base and tire retaining members.

The beads 24 and 25 of the tubeless tire firmly engage the tire bead seat portions 7 and 13 respectively to prevent the escape of air along these bead seat portions.

To seal the gap between the base member 1 and the tire retaining member 2 and to prevent the escape of air between these members, we have provided the annular sealing ring 26 in the annular recess 19 formed by the surfaces 15, 16 and 17. The sealing member is an endless resilient stretchable strip of deformable material, such as rubber, and preferably of circular cross-section. The maximum distance between the axially extending surface 16 and the axially inwardly flaring surface 15, measured at the axially inner edge of surface 15, is less than the cross-sectional diameter of the sealing member so that the sealing member is compressed between these surfaces in the positions of Figs. 1 and 3 and all intermediate positions.

In assembly, the sealing member 26 is first expanded over the base member and positioned as in Fig. 3 so that it encircles the annular portion 9 of the base 4. Then the tubeless tire is moved over the base member to bring one of its beads 24 into sealing engagement with the bead seat portion 7. The tire retaining member 2 is then moved over the base member and the sealing member and its bead seat portion 13 is brought into sealing engagement with the other bead 25 of the tire. The tire retaining member is moved axially inwardly to the Fig. 3 position at which time the axially inner edge of its bead seat portion engages the annular portion 10 of the base 4, and then the clamping member 3 is inserted into the gutter. The tire retaining member 2 and the adjacent portion of the side wall of the tire may then be allowed to move axially outwardly or manually moved axially outwardly to occupy a preliminary inflatable position of assembly shown in Fig. 2, at which time the sealing member is compressed between and deformed into sealing engagement with the surfaces 15 and 16 of the axially extending recess 19. The cross-section of the sealing ring is such that even if it remained at the axially inner edge of the annular surface 16 during axially outward movement of the tire retaining member to the preliminary inflatable position, it would still be deformed between and make sealing contact with surfaces 15 and 16. However, normally the sealing member 26 will be moved axially outwardly with the tire retaining member because of its engagement therewith. In this preliminary inflatable position, the surface 21 of the tire retaining member fully overlies the clamping member to retain it in the gutter.

The tire may then be inflated at which time the inflating air acting through the tire against the tire retaining member 2 assures engagement of the clamping member with the terminal wall 12 of the gutter and moves the tire retaining member to its axially outer position shown in full lines in Fig. 1. In this position the clamping member engages the surfaces 20 and 21 of the tire retaining member at the junction therebetween to transmit radial load and to limit further axially outward movement of the tire retaining member.

During this axially outward movement of the tire retaining member the sealing member also moves outwardly by reason of its friction sealing contact with surface 15 and also because the axially inner side of the sealing member is subject to the pressure of the inflating air through the open axially inner end of the recess 19. The pressure of the air in the tire acts on the sealing member to press it axially outwardly into more firm sealing contact with the axially outwardly converging radially inner and outer surfaces 15 and 16 of the recess and finally to press the sealing member against the axially outer end of the recess defined by surface 17. The gap between the rib 18 and the surface 16 is small enough to prevent the sealing member from extruding therebetween under the pressure of the air.

If for any reason, such as distortion of the sealing ring or an undersize sealing ring, the ring 26 does not make sealing contact with surfaces 15 and 16 in the preliminary inflatable position of Fig. 2, the tire retaining member 2 may be manually moved to the Fig. 3 position to wedge the sealing ring into more firm sealing contact with surfaces 15, 16 and 17 near the axially outer end of recess 19. Then, the tire will hold the inflating air. The sealing contact of the ring 26 with surfaces 15 and 16 may also be broken in the preliminary inflatable position of Fig. 2 by the presence of foreign particles on the sealing ring.

The bead 25, in the fully inflated position, extends substantially entirely axially outwardly beyond the terminal wall 12, and even in the preliminary inflatable position of Fig. 2, which the tire bead 25 assumes naturally, a major portion of the bead extends axially beyond and overhangs the terminal wall. In the case of a puncture or other damage to the tubeless tire, the clamping member 3 and tire retaining member 2 may be removed and access may be readily had to the interior of the tire without removing it from the base member 1. A special temporary inflatable tube may be inserted into the interior of the tire through the space between the bead 25 and terminal wall 12 so that the vehicle may be driven to a repair station where permanent tire repairs can be made.

What we claim as our invention is:

1. A rim for a tubeless tire comprising an endless annular base member, a detachable endless tire retaining member movable over the axially outer edge of said base member and having a generally axially extending portion encircling said base member in the assembled condition of said tire retaining member, said generally axially extending portion and said base member having radially opposed surfaces cooperating to provide an annular space, and a detachable endless deformable, resilient, compressible sealing ring assembled on said base member in encircling relation to said surface of said base member and disposed in said space in sliding contact with said surfaces, said surfaces converging at the axially outer side of said sealing ring, said space at the axially inner side of said sealing ring being in open communication with the air in the tire and said sealing ring being movable axially outwardly relative to said base and tire retaining members by the pressure of such air into more firm sealing contact with the converging portions of said surfaces, said surface of said generally axially extending portion diverging from said surface of said base member to the axially inner edge of said first mentioned surface and at said axially inner edge being of sufficiently greater diameter than said surface of said base member to permit said tire retaining member to be moved axially inwardly to assembled relation over said sealing ring previously assembled on said base member as aforesaid.

2. A rim for a tubeless tire comprising an endless base member having an annular gutter at its axially outer edge formed with a radially outwardly extending terminal wall and a radially outwardly facing annular surface axially inwardly of said gutter, a detachable endless tire retaining member movable over said terminal wall and encircling said base member in the assembled condition of said tire retaining member, said tire retaining member having a generally axially extending portion providing a tire bead seat and having a tire retaining flange portion, said generally axially extending portion having an annular radially inwardly facing surface spaced radially outwardly from said first-mentioned surface, said surfaces converging in an axially outward direction to define a generally axially extending recess which is open at the axially inner end thereof and decreases in cross-section in an axially outward direction from the axially inner edge thereof, a clamping member extending within said gutter and abutting said terminal wall and tire retaining member in the axially outer operative position of the latter, and a detachable endless resilient, deformable, compressible sealing ring assembled on said base member in encircling relation to the first-mentioned surface and disposed in said recess in sliding contact with said surfaces, said recess at the axially inner side of said sealing ring being in open communication with the air in the tire through the open inner end of said recess and said sealing ring being movable by the pressure of such air axially outwardly relative to said base and tire retaining members into firmer wedging and sealing contact with said converging surfaces, said second-mentioned surface of said generally axially extending portion extending to the axially inner edge thereof and at said axially inner edge being of sufficiently greater diameter than said first-mentioned surface to permit said tire retaining member to be moved axially inwardly to assembled relation over said sealing ring previously assembled on said base member as aforesaid.

3. A rim as in claim 2 in which the maximum radial width of said recess in all positions of said tire retaining member from its operative position axially inwardly being less than the normal cross-section of said sealing member so that said sealing member will at all times sealingly engage said surfaces.

4. A rim for a tubeless tire comprising an endless annular base member having an annular gutter at its axially outer edge formed with a radially outwardly extending terminal wall, a detachable endless tire retaining member movable over said terminal wall and encircling said base member in the assembled condition of said tire retaining member, said tire retaining member having a generally axially extending portion and a generally radially outwardly extending tire retaining flange portion, said generally axially extending portion and base member having axially outwardly converging surfaces cooperating to define a generally axially extending annular recess axially inwardly of said gutter, said recess being open at the axially inner end and decreasing in cross-section in an axially outward direction, a rib on said generally axially extending portion substantially closing the axially outer end of said recess, a clamping member extending within said gutter and abutting said terminal wall and tire retaining member in the axially outer operative position of the latter, said tire retaining member being movable axially outwardly against said clamping member during inflation of the tire, and a detachable endless resilient, compressible, deformable sealing ring assembled on said base member in encircling relation to said surface of said base member and disposed in said recess in sliding contact with said surfaces, the axially inner side of said sealing ring being subject to the pressure of the air in the tire through said open end of said recess, said sealing ring being movable axially outwardly relatively to said base and tire retaining members during inflation of the tire by the pressure of the inflating air and movable into firmer sealing contact with said converging surfaces of said generally axially extending portion and base member at said substantially closed axially outer end of said recess by the pressure of the air in the tire, said surface of said base member being cylindrical, said surface of said generally axially extending portion flaring conically from said rib to the axially inner edge of said generally axially extending portion and at said axially inner edge being of sufficiently greater diameter than said surface of said base member to permit said tire retaining member to be moved axially inwardly to assembled relation over said sealing ring previously assembled on said base member as aforesaid, the maximum width of said recess in all positions of said tire retaining member from its operative position axially inwardly being less than the normal cross-section of said sealing member so that said sealing member will at all times sealingly engage said surfaces.

References Cited in the file of this patent
UNITED STATES PATENTS

| | | |
|---|---|---|
| 2,790,476 | Herzegh | Apr. 30, 1957 |
| 2,810,419 | Woodward | Oct. 22, 1957 |

FOREIGN PATENTS

| | | |
|---|---|---|
| 725,767 | Great Britain | Mar. 9, 1955 |
| 1,117,321 | France | Feb. 20, 1956 |

OTHER REFERENCES

Synthetic Rubber Packings, published by the E. F. Houghton Co. Fifth Edition 1952 (pages 72–73).